Jan. 6, 1942. L. L. CUNNINGHAM Re. 21,993

BURNER CONTROL SYSTEM

Original Filed July 19, 1939 3 Sheets-Sheet 1

INVENTOR.
Lewis L. Cunningham
BY
M Ted
ATTORNEY.

Jan. 6, 1942. L. L. CUNNINGHAM Re. 21,993

BURNER CONTROL SYSTEM

Original Filed July 19, 1939 3 Sheets-Sheet 2

INVENTOR.
Lewis L. Cunningham
BY
M Zeto
ATTORNEY.

Jan. 6, 1942. L. L. CUNNINGHAM Re. 21,993

BURNER CONTROL SYSTEM

Original Filed July 19, 1939 3 Sheets-Sheet 3

INVENTOR.
Lewis L. Cunningham
BY
W T Dat
ATTORNEY.

Reissued Jan. 6, 1942 Re. 21,993

UNITED STATES PATENT OFFICE 21,993

BURNER CONTROL SYSTEM

Lewis L. Cunningham, Glendale, Calif., assignor to Perfex Corporation, Milwaukee, Wis., a corporation of Wisconsin Original No. 2,198,556, dated April 23, 1940, Serial No. 235,279, July 19, 1939. Application for reissue March 14, 1941, Serial No. 383,447

36 Claims. (Cl. 158—28)

This invention relates in general to control systems and more particularly to oil burner control systems.

In oil burner control systems it is customary to provide some means which will, in case of ignition failure or flame failure, shut the oil burner down until such means has been manually reset. Such means is generally referred to as a safety switch or lockout switch and usually consists of a switch, a pair of bimetal actuators, and one or two electric heaters. If one of the heaters remains energized for too long a period or if a second heater is not energized after a predetermined time period, the safety switch opens and thereafter remains open until manually reset. The safety switch is usually responsive to combustion conditions. Generally, electric ignition is used for oil burners and if the ignition is left on during the entire period of operation, it is referred to as constant ignition, whereas if the ignition is discontinued a short time after combustion has been established, it is referred to as intermittent ignition.

In intermittent ignition systems, it is customary to turn the ignition off by a switch which is responsive to combustion conditions, such as a switch operated by a piece of bimetal which projects into the furnace stack. Customarily there are or may be various additional auxiliary controls which cooperate to give an entirely automatic system. These controls may be high or low limit controls, low water cut offs, etc., which may or may not be incorporated with the present invention and whose use will not be discussed here.

The primary object of this invention is to provide new and improved control systems for controlling the operation of automatic fuel burners, and more particularly oil burners of the intermittent ignition type.

Another object of this invention is to provide a new and improved timing arrangement for the ignition period for intermittent ignition oil burners.

Another object of this invention is to provide a new and improved timing arrangement for the ignition period for intermittent ignition oil burners which is not responsive to combustion conditions alone.

Another object of this invention is to provide a new and improved timing arrangement for the ignition period for intermittent ignition oil burners, which will insure giving an ignition period which will never fall below a certain selected minimum length of time.

Another object of this invention is to provide a new and improved timing arrangement for the ignition period for intermittent ignition oil burners, which will insure that the ignition means is energized before the fuel feeding motor can be energized.

Another object of the invention is to provide a simplified oil burner control system which will automatically recycle after a power failure immediately upon the resumption of power, but which will not recycle after a flame or ignition failure.

Other objects and advantages reside in certain novel features of the construction, circuit arrangement and operation of the various parts and arrangements which will be hereinafter more fully described in the specification and particularly pointed out in the appended claims, and of which a preferred embodiment is illustrated in the accompanying sheets of drawings forming a part thereof. In the drawings:

*General description*

Figure 1:
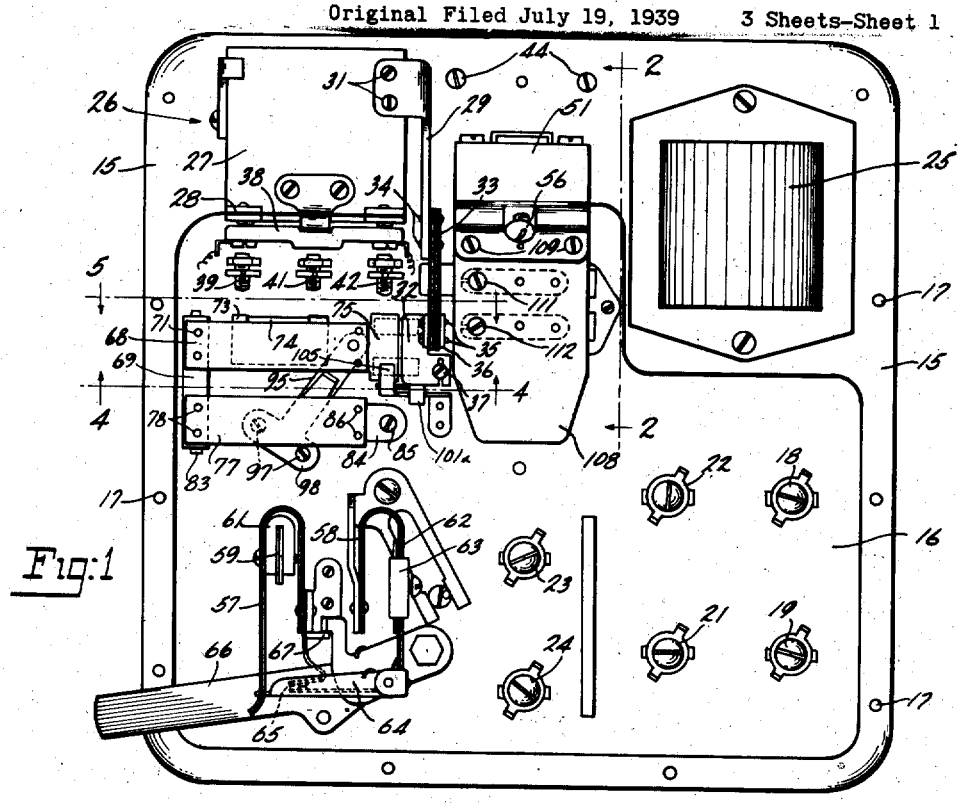
Fig. 1 shows a front elevation of the invention.

Referring particularly to Fig. 1, a base 15 having a turned-up flange is provided for supporting the various parts of the structure. A panel of insulating material 16 is secured to the base 15 by means of rivets 17.

Connection terminals 18, 19, 21, 22, 23 and 24 are supported by the panel 16 and are adapted to receive electrical conductors (not shown). Terminals 18 and 19 receive conductors from a source of power. Terminals 19 and 21 receive conductors from a fuel feeding means. Terminals 19 and 22 receive conductors from an igniting means, and terminals 23 and 24 receive conductors from an automatic operating device such as a thermostat. A pair of mutually coupled reactance coils here shown as a choke or transformer 25 are supported on the base 15. A means for controlling the fuel feeding means and the ignition means such as an electromagnetic relay 26 is additionally supported on the base 15. An armature 27 for the relay is pivoted at the point 28. An interlocking arm 29 is fastened to the relay armature 27 by means of screws 31. An interlocking armature 32 is secured to the interlocking arm 29 by means of an insulating member 33, rivets 34, screws 35 and two-hole bracket 36. The armature 32 is threaded and slotted to receive and frictionally secure a pull-in voltage adjusting screw 37 adapted to engage the panel 16 and thereby limit the motion of the armature 32 in one direction.

A movable contact assembly 38 is insulatively secured to the relay armature 27. Stationary contacts 39, 41 and 42 mounted on the panel 16 cooperate with the movable contact assembly 38 to perform certain switching functions which will be more fully explained hereinafter.

Figure 2:
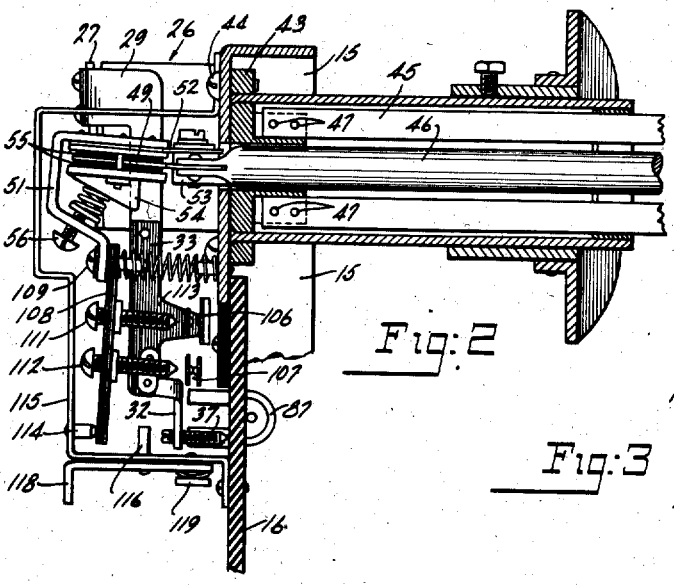
Fig. 2 shows a side elevation of the invention depicting in detail the construction of the combustion responsive mechanism.

A thermal element bracket 43 (Fig. 2) is additionally fastened to the base 15 by means of screws 44. A combustion responsive means such as a U-shaped channel expansible element 45 and a cooperating relatively inexpansible tubular element 46 are provided. The expansible element 45 is secured to the thermal element bracket 43 by means of rivets 47. The tubular element 46 is secured at one of its ends to the middle of the expansible U-shaped element 45 by a rivet 48 and the other of its ends is adapted to pass through an aperture in the thermal element bracket 43 and the base 15 and to receive a flexible slip friction element 49. A U-shaped slip friction housing element or actuator 51 is pivotally secured by a spring hinge 52 to a projecting lug 53 on the thermal element bracket 43: A spring loaded pressure pad 54 is arranged to apply pressure to the flexible slip friction element 49 through two blocks of friction material 55. This arrangement permits linear motion of the inexpansible tube 46 to be converted to rotary motion of the slip friction housing element 51 and further permits unlimited motion of the inexpansible tube 46 although the slip friction housing element 51 is restrained from moving. A screw and spring 56 provide means for adjusting the pressure applied to the flexible slip friction element 49. For a more detailed disclosure of the combustion responsive element and the slip friction means reference may be had to a copending application of William Christiansen, Serial No. 236,818, filed October 24, 1938.

A lockout or safety switch for rendering the fuel feeding and the ignition means inoperative is also supported on the panel 16. This switch includes an active bimetal blade 57 and a compensating bimetal blade 58 arranged to compensate the active blade 57 for changes in ambient temperature. A motivating heater 59 for the active blade 57 is surrounded and secured by a heat absorbing mass 61 which is in turn fastened to the active blade 57. A motivating heater 62 for the compensating blade 58 is secured thereto by an adjustable heat absorbing clamp 63. A latch 64 is arranged to cooperate with the active and compensative bimetal blades 57 and 58 in order to open a pair of switch contacts 65 in the event the active blade 57 deflects in excess of a certain set amount relative to the compensating blade 58. A reset lever 66 together with its reset switch 67 cooperates with the latch 64 to enable the latch to be reset by a manual operation. For a general disclosure of the lockout switch herein described reference may be had to copending applications of Herbert E. Lindemann, filed May 31, 1938, Serial No. 210,867 and J. A. Deubel, filed October 24, 1938, Serial No. 236,819.

Means are also mounted on the base 16 for deenergizing the igniting means after an ignition period. Referring particularly to Figs. 1 and also 4, 5, 6, 7 and 8, an active bimetal element 68 is secured at a spaced distance to a movable U-shaped support bracket 69 by means of rivets 71, spacers 72, and a projecting portion of a motivating heater bracket 73. A motivating heater 74 is secured by the motivating heater bracket 73 in a manner suitable to allow the heat generated by the heater 74 to affect the active bimetal element 68. A switch armature 75 is fastened to the free end of the active bimetal blade 68 by rivets 76 to assume a position substantially opposite the interlocking armature 32. One end of a compensative bimetal element 77 is additionally secured at a spaced distance to the U-shaped supporting bracket 69 by rivets 78 and spacers 79 and is disposed to extend side by side and parallel to the active bimetal element 68. A stationary U-shaped bracket 81 is fastened to the panel 16 by means of rivets 82 and is adapted to cooperate with the movable U-shaped support bracket 69 and a hinge pin 83 to form a pin hinge. An adjusting lug 84, which is threaded and slotted to receive and frictionally secure a support such as an adjusting screw 35, is fastened to the free end of the compensating element 77 by means of rivets 86.

The adjusting screw 85 provides an adjustment for the elevation of the compensating bimetal element 77 above the panel 16 and this in turn adjusts the length of the ignition period as will be more fully disclosed hereinafter.

Figure 6:
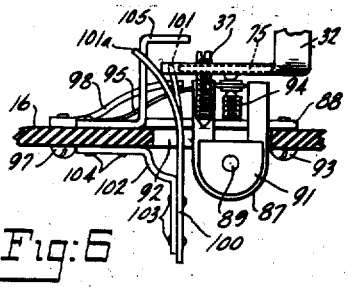
Fig. 6 is an end view of the ignition timing mechanism showing the mechanism in the standby or idle position.
Figure 5:
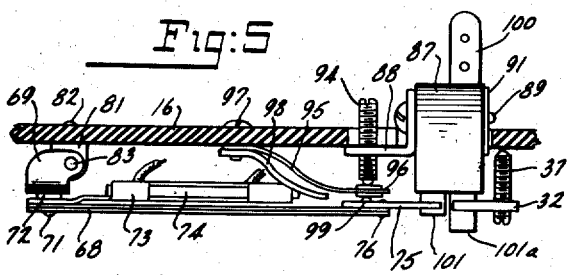
Fig. 5 shows the details of the ignition timing mechanism as seen from the section line 5—5 of Fig. 1.

Magnetic biasing means for the ignition switch such as a horse shoe magnet 87 is secured to a right angle support 88 by means of a screw 89 passing through the opening between the poles of the magnet and threading into a plate 91. One leg of the right angle support 88 projects through an aperture 92 in the panel 16, while the other leg is disposed to rest upon and is secured to the panel 16 by screws 93 passing through the panel 16 from the under side and threading into the right angle support 88. With the right angle support 88 mounted in this manner the permanent magnet 87 also projects through the aperture 92 in the panel 16 and its poles are positioned directly below the interlocking armature 32 and the switch armature 75 in order that the two armatures will be mutually attracted to it. The right angle bracket 88 is slotted and threaded to receive and frictionally secure a contact screw 94. A spring contact blade 95 carrying a contact 96 is secured to the panel 16 by screws 97 threading into a keeper 98. The spring blade 95 is positioned so that the contact 96 engages the contact screw 94 as well as contact 99 carried on the switch armature 75 when the switch armature is in its innermost position. (See Fig. 5.) A latch such as the spring latch 100 having a catch 101 and a release slide 101—A, also projects through the aperture 92 and is arranged to cooperate with the switch armature 75 and the interlocking armature 32 to perform certain functions as will be more fully pointed out hereinafter. The spring latch 100 is fastened to one leg of a latch bracket 102 by rivets 103 while the other leg is secured to the back of the panel 16 by rivets 104. (See Fig. 6.) An S-shaped bracket 105 for limiting the outward motion of the active bimetal element 68 is fastened to the front of the panel 16 by the rivets 104, which also secure latch bracket 102.

Figure 3:
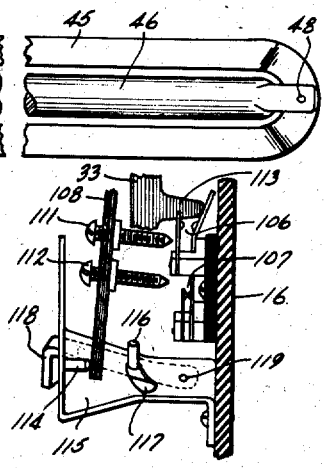
Fig. 3 is a perspective view showing the details of the combustion responsive switches of the invention.

Two pairs of combustion responsive contacts 106 and 107 (see Figs. 2 and 3) for controlling the lockout switch and the starting circuit respectively, are supported on the panel 16 and are disposed directly behind an insulating member 108 which is secured to the slip friction housing or actuator 51 by screws 109. Switch operating screws 111 and 112 project through the insulating member 108 and serve to operate switches 106 and 107, respectively, in response to the action of the slip friction housing or actuator 51.

A projection 113 on the relay insulating member 33 (Figs. 2 and 3) is disposed to open the contacts 106 when the relay is in the open position regardless of the position of the slip friction insulating member 108.

The combustion responsive switch 107 is merely an accessory switch for interposing delay between successive motor energizations. It is not entirely essential to the satisfactory operation of the system and may be shunted out of the circuit if the delay it produces is not desirable under some conditions of operation.

A "cold" stop pin 114 is fastened to a stop bracket 115 which in turn is secured to the panel 16 and the base 15 by suitable means. A movable "hot" stop 116 projects through a slot 117 in the stop bracket 115 and is fastened to an adjusting arm 118 which is pivoted to the stop bracket 115 by a screw 119. The "cold" stop 114 and the "hot" stop 116 serve to limit the motion of the slip friction insulating member 108 as will be more fully explained hereinafter.

Rotating the adjusting arm 118 moves the "hot" stop 116 relative to the "cold" stop 114 and serves to change the amount of travel of the insulating member 108.

The adjustable hot stop 116 shown herein is an accessory not essential to the satisfactory performance of the system. It may be replaced by a fixed stop if such is found to be desirable.

Figures 10, 11, 12, 13:
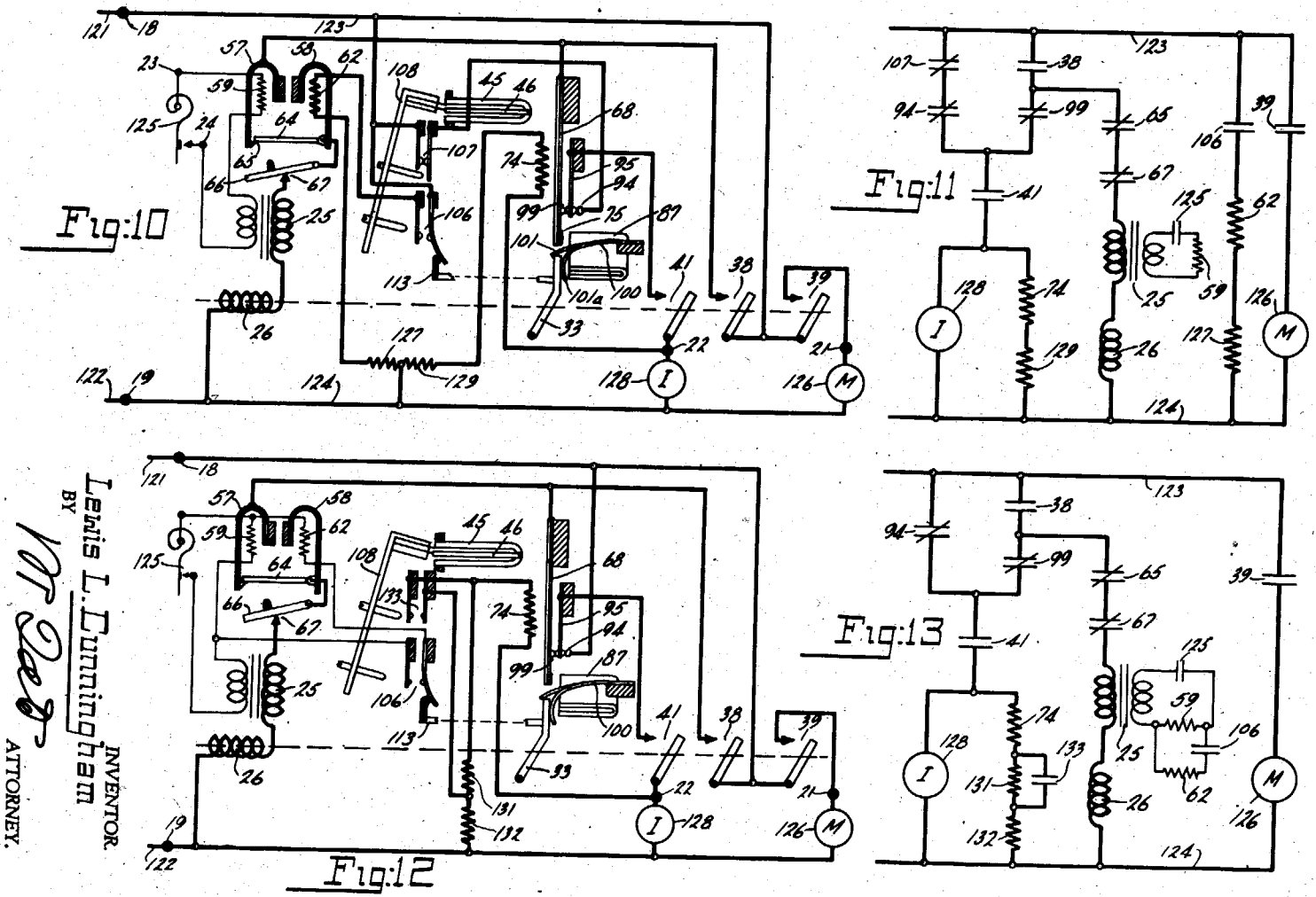
Fig. 10 is a semi-schematic wiring diagram of one form of the invention.
Fig. 11 is a full schematic wiring diagram of one form of the invention.
Fig. 12 is a semi-schematic wiring diagram of the second form of the invention.
Fig. 13 is a full schematic wiring diagram of the second form of the invention.

Referring now particularly to Figs. 10 and 11 showing circuit diagrams of one form of the system:

Conductors 121 and 122 leading from the source of power are connected to the terminals 18 and 19. A circuit path extends from terminal 18, through a conductor 123, through the combustion responsive contacts 107, through the ignition contacts 94 and 99, through the lockout switch contacts 65, through the reset contacts 67, through the high voltage or primary side of the transformer 25, through the relay coil 26, through a conductor 124 to the other side of the line at terminal 19. The lockout heater 59 is connected in series with an automatic operating device such as a thermostat 125 across the secondary or low voltage side of the transformer 25. The fuel feeding means or burner motor 126 is connected in series with the relay contacts 39 to the source of power by means of conductors 123 and 124. The lockout compensator heater 62 is connected in series with a voltage dropping resistor 127 and the combustion responsive contacts 106, and the combination is connected across the line by means of conductors 123 and 124. Relay contacts 38 serve as holding contacts and connect from one side of the ignition switch 99 to one side of the line through conductor 123. An igniting means 128 is connected in series with the relay contacts 41. One side of this series combination is connected to one side of the line by the conductor 124 and the other side is connected to the junction between the ignition switches 94 and 99. The ignition switch motivating heater 74 in series with a voltage dropping resistor 129 is connected in parallel with the igniting means 128.

*Operation*

Under normal standby conditions a small current flows through the relay circuit extending from conductor 123 through the normally closed combustion responsive contacts 107, through the normally closed ignition switch contacts 94 and 99, through the normally closed safety switch contacts 65, and reset contacts 67, through the transformer primary 25, through the relay 26, to the conductor 124. Relay contacts 38, 39 and 41, combustion responsive contacts 106, and thermostat contacts 125 are all open under these conditions.

*Normal start*

Figure 7:
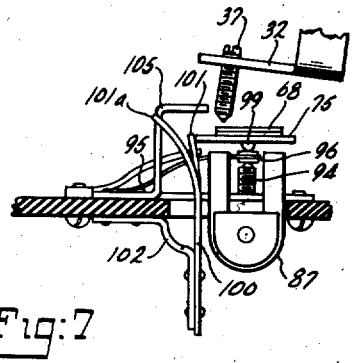
Fig. 7 is an end view of the ignition timing mechanism showing the mechanism during the ignition period of the operating or running period.

If the temperature in the space being heated falls below a predetermined point, the thermostat contacts 125 close and the lockout resistor 59 is shunted across the secondary of the transformer 25. Closing the transformer secondary circuit causes a considerably greater amount of current to flow in the relay circuit. The relay 26 is then sufficiently energized to attract its armature. The contacts 38, 39 and 41 close and the interlocking armature 32 lifts out of contact with the release slide 101—A and allows the catch 101 to spring once and rest against the edge of the switch armature 75. (See Fig. 7.) As a result the motor 126 is energized from the line through conductors 123 and 124 and the relay contacts 39. The igniting means 128 is energized from the conductor 124 and the conductor 123 through contacts 41 in series with the ignition switch contacts 94 and the combustion responsive contacts 107 in series parallel relation with the ignition switch contacts 99 and the relay contacts 38. The ignition switch heater 74 is energized in parallel with the igniting means in series with the voltage dropping resistor 129.

Figure 9:
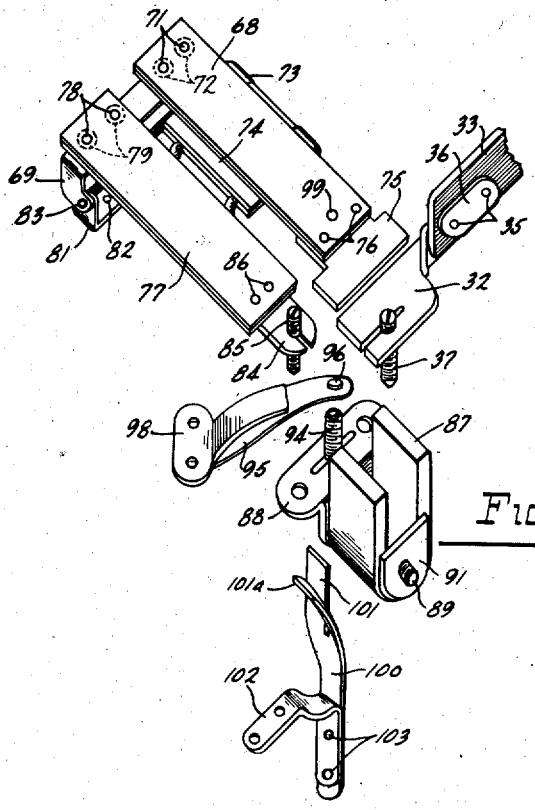
Fig. 9 is an exploded perspective view showing the details of the ignition timing mechanism.
Figure 8:
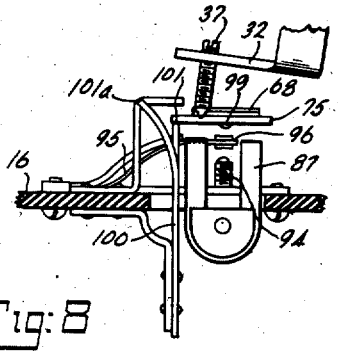
Fig. 8 is also an end view of the ignition timing mechanism, but shows the mechanism during the operating or running period after the ignition period has expired.

As a result of this action the lock switch motivating heater 59 is energized causing the active bimetal 57 to deflect towards the left, and the ignition switch heater 74 is energized and heats the active bimetal 68 causing it to build up effort in a direction away from the panel 16 and in opposition to the magnetic effort due to the permanent magnet 87. Normally combustion is also established and the thermal element 45—46 heats and causes counterclockwise deflection of the slip friction insulating member 108. After a short time the contacts 107 open the starting circuit for the relay but since a holding circuit has been established through relay holding contacts 38 the relay remains energized through a circuit extending from the conductor 123, through relay contacts 38, through the lock switch contacts 65 and the reset contact 67, through the transformer primary winding 25, through the relay 26 to the conductor 124. The igniting means also remains energized through a circuit path extending from conductor 123 through relay contacts 38, through ignition switch contacts 99, through relay contacts 41, through the igniting means 128 to the conductor 124. The combustion responsive contacts 106 close at approximately the time combustion responsive contacts 107 open. This energizes the lockout switch compensating heater 62 causing the compensator blade 58 to deflect to the left to follow the deflection of the active bimetal blade 57 and thus keep the circuit to the relay 26 closed at contacts 65. After some time, for example 90 seconds, the ignition switch active blade 68 reaches a high enough temperature to stress the ignition switch assembly a sufficient amount to cause the ignition switch armature 75 to spring away from the permanent magnet 87. The effort which causes the snap action of the armature 75 stresses the entire ignition switch assembly which consists of the adjusting screw 85, the adjusting lug 84, the compensating bimetal element 77, the U-shaped hinge bracket 69, the active bimetal blade 68 and the armature 75. The reactive opposing force ultimately appears between the adjusting screw 85 and the panel 16. (See Figs. 7, 8 and 9.) When the active blade 68 snaps away from the magnet 87, the spring latch 100 immediately assumes a position perpendicular to the panel 16 and the catch 101 moves directly below the armature 75 in order that the armature 75 may not again return to its initial position unless the electromagnetic relay 26 resets the ignition switch (see Fig. 8). This action will be more fully explained hereinafter.

The S-shaped bracket 105 serves to limit the motion of the ignition switch armature 75 and thereby prevent it from snapping out of the range of the permanent magnet 87. When the ignition switch armature 75 springs away from the magnet 87 the ignition contacts 94 and 99 open interrupting the circuit to the igniting means and the igniting switch motivating heater 74 and opening the starting circuit for the relay 26. The spring blade 95 assumes a position midway between the contacts 94 and 99. As time goes on the slip friction insulating member 108 eventually reaches the hot stop 116 and the slip connection actuates causing the slip friction blade 49 to slide between the friction blades 55. Eventually the lock switch active bimetal blade 57 and compensating bimetal blade 58 reach their ultimate heated positions and the ignition switch active bimetal blade 68 cools to the ambient temperature. As the bimetal blade 68 cools it encounters the catch 101 on the spring latch 100 and can then deflect no farther toward the panel. (See Fig. 8.) As additional cooling takes place, however, the U-shaped hinge bracket 69 rotates under the deflecting action of the bimetal 68 causing the compensating blade 77 to elevate and lift the adjusting screw 85 out of contact with the panel. The control device is now in the normal running position and the various component parts of the structure will remain as positioned until the automatic control device 125 is satisfied, a combustion failure occurs, a power failure occurs or some element in the control device becomes inoperative.

*Normal shut-down*

Assume that the control is functioning as stated above, and that the room thermostat 125 is satisfied and opens its contacts. The open secondary of the transformer 25 immediately causes the current in the relay circuit to drop to a very small value. The relay releases its armature and the relay contacts 38, 39 and 41 open, deenergizing the fuel feeding means 126 and opening the holding circuit for the relay 26 at contacts 38. The interlocking arm 33 together with its armature 32 swings toward the panel and encounters the slide release 101A on the spring latch 100 moving the catch 101 out from under the ignition switch armature 75. This allows the armature 75 to return to its initial closed position under the attractive effort of the permanent magnet 87, and causes the ignition switch contacts 94 and 99 to close and partially complete the starting circuit for the relay 26. (See Fig. 6.) It will be seen that both contacts 94 and 99 must be closed before the starting circuit is complete. This insures that the ignition means will be energized before the fuel feeding motor can be energized. The projection 113 on the insulating interlocking arm 33 of the relay 26 also encounters one portion of the combustion responsive switch contacts 106 causing them to open and deenergize the motivating heater 62. As a further result of the relay action combustion is discontinued and the thermal responsive element 45—46 cools and causes the immediate clockwise rotation of the slip friction insulating member 108. After the temperature of the thermal responsive element has dropped a predetermined amount, for example 80°, the thermal responsive contacts 107 close to complete the line voltage side of the starting circuit for the relay 26. Upon further cooling of the thermal element 45—46 the insulating member 108 engages the cold stop 114 and can move no farther. Continued motion of the thermal element 45—46 then causes the slip connection to operate and the slip friction blade 49 slides between friction blades 55.

Figure 4:
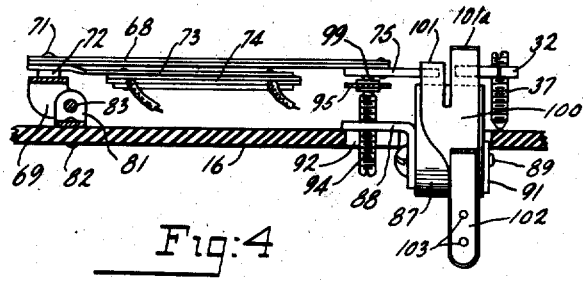
Fig. 4 illustrates the details of the ignition timing mechanism as seen from the section line 4—4 of Fig. 1.

It is to be understood that during this interval of time the lock switch motivating heater 59 has been deenergized in response to the thermostat 125 action, as well as the compensating heater 62, and the two lock switch bimetal blades 57 and 58 are cooling to the ambient temperature. When the cooling of the lock switch bimetal blades 57 and 58 is complete, the control will be in a normal starting position and the ignition switch will be positioned as shown in the Figs. 4, 5 and 6.

*Ignition failure*

Assume that the control is in the normal starting position and that the thermostat contacts 125 close in response to the temperature in the space being heated. The relay 26 will then operate in response to the transformer 25 action as stated above. The fuel feeding means 126 and ignition means 128 will be energized as well as the motivating heater 59 for the active blade of the ignition switch 68. Assume now that combustion is not established because of failure in the igniting means or for some other reason, so that the thermal element 45—46 will not be heated and consequently the slip friction insulating member 108 will not cause any action of the combustion responsive contacts 106 and 107. Under these circumstances the compensating heater 62 will not be energized. As time goes on the active blade 57 will deflect away from the compensating blade 58 and the relative distance between the two will increase until the latch 64 trips and opens the circuit through the relay 26 at contacts 65. This tripping action is adjustable and may be set for ninety (90) seconds, for example, after the fuel feeding means is energized. Deenergization of the relay 26 by the lock switch causes a complete shut-down of the system, and another operating cycle cannot be initiated until the lock switch is manually reset by use of the lever 66. As may be seen from Fig. 1 or Fig. 10, moving the lever 66 upward causes it to engage the latch 64 and lift the latch to its normal operating position causing the closure of the contacts 65. So long as the lever 66 is in its raised position, the reset contacts 67 hold the relay circuit open. This prevents operating the system by holding the lockout switch in the operating position by artificial means.

During the interval of time, from the energization of the fuel feeding means by the thermostat 125 to the deenergization of the system by the lock switch, the ignition switch functions in exactly the same manner as outlined under "Normal starting". The ignition system timing and the lockout switch are entirely divorced under these circumstances.

*Flame failure*

Assume now that the system has progressed through a normal starting operation, has been operating for some time and that now for some reason there is a flame failure. Under these circumstances the thermal element 45—46 cools and causes the clockwise rotation of the slip friction insulating member 108. When the temperature drops in excess of a certain predetermined amount, for example 80°, the contacts 106 open the circuit through the compensator heater 62. The compensator blade 58 starts to cool immediately and deflects toward the right away from the active blade 57, which is still being heated. After a short interval of time, the distance between the two blades becomes great enough to allow the release of the latch member 64 and the contacts 65 open, causing the deenergization of the relay 26 and a complete shut-down of the system. Now, as in the case of the ignition failure operation, the system cannot be made operative until the lock switch latch 64 is manually reset.

*Power failure during a normal running period*

Assume that the system has progressed through a normal starting operation, has been running satisfactorily for some time, and a short interruption of power occurs. Under these conditions the relay 26 drops out, immediately opening the contacts 38, 39, 41 and 106, associated with it. Combustion also ceases immediately and the thermal element 45—46 proceeds to cool. If power is again established immediately after this interruption, the control will not operate, since the slip friction insulating arm 108 will not have had sufficient time to move from its hot position toward its cold position, and the contacts 107 operated by it will remain open, so that there is no starting circuit for the relay 26. However, when the temperature of the thermal element 45—46 drops sufficiently far, 80° for example, the slip friction insulating member 108 will have rotated sufficiently to cause the closure of contacts 107 and a starting circuit for the relay will be established. When the starting circuit is re-established the relay 26 immediately pulls in and the system progresses as it would under a normal starting operation.

*Power failure during a subnormal running period*

Assume that the system has partially progressed through a normal starting operation and that a short power failure occurs. Under these circumstances it is likely that the thermal element 45—46 will have reached a sufficiently high temperature to have just operated the contacts 106 and 107, but that the ignition switch has not snapped open as yet, although it is on the verge of doing so. When the power failure is experienced, the relay 26 immediately releases its armature 27 and causes the interlocking armature 32 to revolve and come to rest in its normal standby position directly above the permanent magnet 87. In this position, the interlocking armature 32 shades the permanent magnet 87 to a marked degree and causes the magnetic attraction on the ignition switch armature 75 to diminish a considerable amount. At the time of the power failure the ignition switch assembly exerts a substantial force in opposition to the magnetic effort, but this force is insufficient to nullify the magnetic attraction of the unshaded permanent magnet. Now when the magnet is shaded by the armature 32 the effort of the ignition switch assembly exceeds that of the shaded permanent magnet and the ignition switch snaps open. If power is immediately returned, the system will not operate since the starting circuit for the relay 26 is open at contacts 94 and 99. The control will stand by until the ignition switch bimetal 68 cools a predetermined amount and the armature 75 deflects toward the permanent magnet until the magnetic effort of the shaded permanent magnet 87 is sufficiently strong to cause the ignition switch armature 75 to snap back to the closed position. When this occurs, contacts 94 and 99 close and partially complete the starting circuit for the relay 26. However, the thermal responsive contacts 107 must also be closed in addition before the relay may pull in. In a normal installation by the time the ignition bimetal 68 has cooled sufficiently to cause closure of the contacts 94 and 99, the thermal element 45—46 will also have had sufficient time to cause the thermal responsive contacts 107 to close. When the starting circuit for the relay is completed the control will proceed with a normal starting operation as stated above. It is to be understood that under any circumstances the initiation of a burner operating period is prevented by the warp switch contacts until the difference between the warp switch temperature and the ambient temperature is below a predetermined amount.

A second form of the system is shown in Figs. 12 and 13. Here the combustion responsive contacts 107 have been removed from the starting circuit in order to enable the control to start the burner independent of combustion conditions and to consequently prevent delay between normal successive burner operations. The voltage dropping resistor 129 of Fig. 10 has been divided into resistors 131 and 132. Normally open combustion responsive contacts 133 have been substituted for normally closed combustion responsive contacts 107 with the contacts 133 arranged to shunt the resistor 131 shortly after combustion is established to increase the heat generated by heater 74 and to consequently shorten the length of the ignition period.

The circuit position of the compensator heater 62 has also been changed and the heater 62 is connected in parallel with the active heater 59 in series with the normally open combustion responsive contacts 106.

Under normal starting conditions this modification will function identically as the first form of the invention except that the ignition period will not be of a predetermined length but will be modified somewhat upon combustion conditions. The control action under normal shutdown, ignition and flame failure conditions will also be identical with that of the first form of the invention, but the control action under power failure conditions may be somewhat different depending upon circumstances. In the case of the modification, in the event of a power failure during a normal running period, there is never a delay in initiating a burner operating period upon the resumption of power since the initiation of a burner operation is in no way dependent upon combustion conditions and it is not necessary for the insulating member 108 to return to the cold position in order to reestablish a starting circuit for the relay 26 through combustion responsive contacts.

Upon a momentary power failure during a subnormal running period the modification of the invention will delay initiating a burner operation only so long as is required for the ignition switch bimetal 68 to cool and close contacts 94 and 99. There can be no additional delay interposed because of combustion responsive conditions as in the case of the first form of the invention.

While the features of the invention have been illustrated and described in only a few of their practical applications, it will be understood that other applications thereof may be apparent to those skilled in the art and it is therefore desired that the invention be not limited to the particular disclosure made herein, but only by the scope of the appended claims.

What is claimed is:

1. In an intermittent ignition type oil burner circuit, the combination of a relay for controlling the burner operation together with a warp switch timer for disconnecting the burner ignition means, magnetic means for biasing the warp switch in circuit closing position and the relay in circuit opening position, and a latch member cooperating with the relay for preventing the warp switch from moving to circuit closing position during continued burner operation.

2. In an intermittent ignition oil burner circuit, the combination of a relay armature for starting the operation of the burner together with a warp switch for controlling the ignition timing of the burner, magnetic means for normally biasing the relay armature in circuit opening position and the warp switch in circuit closing position, and a spring latch member having two projections thereon, one of said projections engageable by the relay armature in its normal position to hold the other projection out of engagement of the warp switch, and permitting the said other projection to engage the warp switch after the relay armature has operated.

3. In an intermittent ignition oil burner circuit, the combination of a relay armature for starting the operation of the burner together with a warp switch timer for timing the duration of the ignition, magnetic means for normally biasing the relay armature in circuit opening position and the warp switch in circuit closing position, and a latch member associated with the relay armature and warp switch, said latch member arranged to be released by the operation of the relay armature so as to prevent the warp switch from moving to circuit closing position after having been operated, whereby a minimum ignition timing period is provided.

4. A burner control system comprising means for feeding fuel to a burner, means for igniting the fuel, magnetically biased thermal means for rendering said igniting means effective for a time period upon each successive normal operation of said fuel feeding means, a lockout means for rendering said system inoperative in the event of ignition or combustion failure, and means responsive to combustion for rendering the lockout switch inoperative during normal combustion and for shortening said igniting time period after combustion is established.

5. A burner control system comprising, means for feeding fuel to a burner, electrical means for controlling said fuel feeding means, means for igniting the fuel, magnetically biased thermal means for rendering said igniting means effective for a time period upon each successive normal operation of said fuel feeding means, a lockout means for rendering said system inoperative in the event of ignition or combustion failure and magnetic interlocking means cooperating with said fuel controlling means and said ignition controlling means for insuring at least a minimum predetermined ignition period after energization of said fuel controlling means.

6. A burner control system comprising means for feeding fuel to a burner, means for controlling said fuel feeding means, means for igniting the fuel, magnetically biased thermal means for rendering said igniting means effective for a time period upon each successive normal operation of said fuel feeding means, a lockout means for rendering said system inoperative in the event of ignition or combustion failure, means responsive to combustion for rendering said lockout switch inoperative and for shortening said ignition time period upon the establishment of combustion, and magnetic interlocking means cooperating with said fuel controlling means and said ignition controlling means for insuring at least a minimum predetermined ignition period after energization of said fuel controlling means.

7. A control system comprising, fuel feeding means, igniting means, an electromagnetic relay for controlling said fuel feeding means and igniting means having open and closed positions, a thermal operated switch for additionally controlling the igniting means having open and closed positions, a latch cooperating with said electro-magnetic relay and with said thermal switch for holding the thermal switch in said open position once it has reached that position so long as the electromagnetic relay is in the closed position, said latch also arranged to permit said thermal switch to return to its closed position when the electromagnetic relay is in the open position, a permanent magnet cooperating with said electromagnetic relay and said thermal switch, said permanent magnet arranged to bias said electromagnetic relay in the open position and said thermal operated switch in the closed position and said electromagnetic relay arranged to modify the attractive effort of said permanent magnet upon said thermal switch.

8. A burner control system comprising, means for feeding fuel to a burner, means for igniting the fuel, means for controlling the length of time the igniting means is energized, said means including a pair of bimetal elements arranged to compensate each other for changes in ambient temperature, a hinged means for supporting said elements, a heater for one of said elements for motivating the same, a plurality of contacts operated by said bimetal elements, a permanent magnet for biasing said bimetal elements in a direction so as to close said contacts, an electromagnetically operated armature cooperating with said permanent magnet to modify the biasing effort of said permanent magnet upon said bimetal elements to insure that the igniting means is energized for at least a predetermined minimum length of time.

9. A burner control system comprising, means for feeding fuel to a burner, means for igniting the fuel under normal and abnormal conditions, first switching means for controlling the energization and deenergization of said fuel feeding means, second switching means having first and second positions for controlling the energization and deenergization of said igniting means, said second switching means arranged to normally move from its first position to its second position after the expiration of a predetermined time interval which is initiated at the time said fuel feeding means is energized, and said first switching means arranged to mechanically cooperate with said second switching means under normal conditions to cause said second switching means to return to its first position immediately upon the deenergization of the fuel feeding means but under abnormal conditions to magnetically cooperate to cause said second switching means to return to its first position after a time delay following deenergization of the fuel feeding means.

10. A burner control system comprising, a motor for feeding fuel to a burner, an electric means for igniting the fuel, a circuit for the motor, a relay for controlling the motor circuit, a circuit for said relay, a circuit for said igniting means, a thermally operated switch having first and second positions for controlling the igniting circuit and the relay circuit, two pair of contacts on said thermal switch, a safety switch for additionally controlling the relay, a pair of mutually coupled reactance coils, a source of power, said relay, one of said reactance coils, said safety switch and said thermal switch contacts all connected in series arrangement across said source of power, a pair of contacts on said relay connected in parallel with said thermal switch contacts, a second pair of relay contacts, one of said pairs of said thermal switch contacts and said second pair of relay contacts connected in series with said igniting means across the source of power, a heater for motivating said thermal switch, a voltage dropping resistor, said resistor and said heater connected in series circuit arrangement in parallel with said igniting means, a combustion responsive switch, a pair of contacts on said switch connected in parallel with said voltage dropping resistor, a motivating heater for said safety switch, an automatic operating device, said operating device and said safety switch heater connected in series circuit arrangement across said second reactance coil, a second motivating heater for the safety switch, a second pair of contacts on the combustion responsive switch, and said second safety switch heater and said second pair of contacts connected in series circuit arrangement in parallel with the first motivating heater.

11. A burner control system comprising, means for feeding fuel to a burner, means for igniting the fuel, an electromagnetic relay having open and closed positions for controlling the energization and deenergization of the igniting means, said thermally operated snap action switch operating to normally provide a first predetermined ignition period, means cooperating with said electromagnetic relay for holding said thermally operated snap action switch in the open position once it has reached this position so long as the electromagnetic relay is in the closed position but permitting said thermally operated snap action switch to return to its closed position so long as the electromagnetic relay is in the open position, cooperating means between said electromagnetic relay and said thermally operated snap action switch for causing said thermally operated snap action switch to open prematurely in the event said electromagnetic relay returns to the open position before the normal ignition period has expired but after a second predetermined period has expired, said second predetermined period being equal to the first normal ignition period minus a predetermined minimum ignition period, and means for rendering said system inoperative so long as both said thermally operated snap action switch and said electromagnetic relay are in the open position.

12 A burner control system comprising, means for feeding fuel to a burner, means for igniting the fuel, an electromagnetic relay for controlling the fuel feeding and the ignition means, a thermally operated snap action switch for rendering said igniting means effective for a time period upon each successive normal operation of said fuel feeding means, a thermally operated lock-out switch for rendering said system inoperative in the event of ignition or combustion failure, a low voltage operating device, means for operating said relay by said low voltage device, means responsive to differences in combustion conditions for controlling said lock-out switch and for modifying the length of said ignition time period magnetic interlocking means cooperating with said relay and said thermal snap switch for preventing the initiation of an operating period in the event that said thermal snap switch would be unable to provide at least a minimum predetermined ignition period.

13. A burner control system comprising, means for feeding fuel to a burner, means for igniting the fuel, an electromagnetic relay having open and closed positions for controlling the energization and deenergization of said fuel feeding means, a thermally operated snap action switch having open and closed positions for controlling the energization and deenergization of the igniting means, said thermally operated snap action switch operating to normally give a predetermined ignition period, means cooperating with said electromagnetic relay for holding said thermally operated snap action switch in the open position once it has reached this position so long as the electromagnetic relay is in the closed position but permitting said thermally operated snap action switch to return to its closed position so long as the electromagnetic relay is in the open position, cooperating means between said electromagnetic relay and said thermally operated snap action switch for causing said thermally operated snap action switch to open prematurely in the event said electromagnetic relay returns to the open position shortly before the normal ignition period has expired, and means responsive to combustion for interposing delay between successive burner energizations.

14. A burner control system comprising, means for feeding fuel to a burner, means for igniting the fuel, a line voltage circuit, an electromagnetic relay in the line voltage circuit for controlling the fuel feeding and the ignition means, a thermally operated snap action switch having open and closed positions for rendering said igniting means effective for a timed ignition period upon each successive normal operation of said fuel and feeding means and for initiating each successive burner operation, a bimetal actuator for actuating said snap action switch, means for supporting the actuator and for compensating the actuator for changes in ambient temperature, a permanent magnet for biasing the switch in a closed direction, and a heater energized during the ignition period only for motivating the actuator in a direction to open the switch, a retaining latch for holding the switch open once it has reached the open position, interlocking means on said relay for increasing the pull-in voltage of said relay, for releasing said retaining latch, and for shunting said permanent magnet to cause the release and opening of said thermal switch and thereby prevent the initiation of an operating period in the event that said thermal snap switch is closed and unable to provide at least a minimum predetermined ignition period, a thermally operated lock-out switch for rendering said system inoperative in the event of ignition or combustion failure, a low voltage operating device, means for operating said relay in the line voltage circuit by said low voltage device, means responsive to differences in combustion conditions for controlling said lock-out switch and for modifying the length of said ignition time period.

15. A burner control system comprising, means for feeding fuel to a burner, means for igniting the fuel, a line voltage circuit, an electromagnetic relay in the line voltage circuit for controlling the fuel feeding and the ignition means, a thermally operated snap action switch having open and closed positions for rendering said igniting means effective for a timed ignition period upon each successive normal operation of said fuel feeding means and for initiating each successive burner operation, a bimetal actuator for actuating said snap action switch, a permanent magnet for biasing the switch in a closed direction, and a heater energized during the ignition period only for motivating the actuator in a direction to open the switch, a retaining latch for holding the switch open once it has reached the open position, means for supporting the actuator and compensating the actuator for changes in ambient temperature whereby the effort exerted by the switch on the retaining latch is substantially that due to the biasing effort of the permanent magnet alone when said switch is in the open position, interlocking means on said relay for increasing the pull-in voltage of said relay, for releasing said retaining latch, and for shunting said permanent magnet to cause the release and opening of said thermal switch and thereby prevent the initiation of an operating period in the event said thermal snap switch is closed and unable to provide at least a minimum predetermined ignition period, a thermally operated lock-out switch for rendering said system inoperative in the event of ignition or combustion failure, a low voltage operating device, means for operating said relay in the line voltage circuit by said low voltage device, means responsive to differences in combustion conditions for controlling said lock-out switch and for modifying the length of said ignition time period.

16. A burner control system comprising, a fuel feeding motor, an igniter, a line voltage circuit for said motor and igniter, a step-down transformer having primary and secondary coils, a relay connected in series with said primary coil for controlling the circuit to said motor and igniter, condition responsive means in series with said secondary coil for controlling the energization and deenergization of said relay, a normally closed warp switch energized simultaneously with the motor and igniter for deenergizing both the igniter and itself upon movement away from the closed position after a time period, a magnet arranged to bias the relay toward its deenergized position and to bias the warp switch toward its closed position, a latch arranged to hold the warp switch away from the closed position, said relay arranged upon deenergization to operate the latch and release the warp switch, a time delay manually reset lock-out switch for rendering the system inoperative including an actuator energized by the condition responsive means for opening the lock-out switch, and combustion responsive means for preventing the opening of the lock-out switch during the existence of combustion.

17. A burner control system comprising, a fuel feeding motor, an igniter, a line voltage circuit for said motor and igniter, a step-down transformer having primary and secondary coils, a relay connected in series with said primary coil for controlling the circuit to said motor and igniter, condition responsive means in series with said secondary coil for controlling the energization and deenergization of said relay, a normally closed warp switch energized simultaneously with the motor and igniter for deenergizing both the igniter and itself upon movement away from the closed position after a timed period, a magnet arranged to bias the relay toward its deenergized position and to bias the warp switch toward its closed position, a latch arranged to hold the warp switch away from the closed position, said relay arranged upon deenergization to operate the latch and release the warp switch, a time delay manually reset lock-out switch for deenergizing the system including a first actuator energized by the condition responsive means concurrently with the relay for opening the lock-out switch, and a second actuator energized by combustion responsive means for preventing the opening of the lockout switch during the existence of combustion.

18. A burner control system comprising, a fuel feeding motor, an igniter, a line voltage circuit for said motor and igniter, a relay for controlling the circuit to said motor and igniter, condition responsive means for controlling the energization and deenergization of said relay, a warp switch having normally closed contacts in series with said relay for initiating the energization of the relay and for additionally controlling the igniter, a heater energized coincidentally with the igniter for heating and motivating the warp switch to open the normally closed contacts and render the igniter and the heater ineffective after a time delay, a magnet arranged to bias the relay toward its deenergized position to prevent the relay from pulling in at a low voltage and to bias the warp switch in a direction to close the normally closed contacts and render the warp switch snap acting, a latch having an integral catch and a slide arranged to provide cooperative action between the relay and the warp switch, said catch disposed to restrain the warp switch after each ignition period expires to prevent the normally closed contacts from closing after the heater is deenergized and the warp switch cools, interlocking means on the relay for engaging said slide and operating said catch to relase the warp switch and permit the normally closed contacts to close at the end of each burner operating period, said interlocking means being additionally arranged to diminish the biasing effort of the magnet upon the warp switch and cause the warp switch to open the normally closed contacts in the event the warp switch is heated above a predetermined amount to prevent the initiation of a burner operating period until the warp switch is cooled, a time delay manually reset lock-out switch for rendering the system inoperative including an actuator energized by the condition responsive means for opening the lock-out switch, and combustion responsive means for preventing the opening of the lock-out switch during the existence of combustion.

19. A burner control system comprising, a fuel feeding motor, an igniter, a line voltage circuit for said motor and igniter, a relay for controlling the circuit to said motor and igniter, condition responsive means for controlling the energization and deenergization of said relay, a warp switch having a hot position and first and second cold positions, a pair of contacts closed in the first cold position and open in the second cold position for initiating operation of the fuel feeding motor and controlling the igniter, a heater energized coincidentally with the igniter for heating and motivating the warp switch away from the cold position to the hot position to open the contacts and render the igniter and the heater ineffective after a time delay, a latch cooperating with said warp switch and said relay for restraining the warp switch at the second cold position when said warp switch cools from the hot position so long as the relay is closed and to permit the warp switch to move from the second cold position to the first cold position when the relay opens, magnetic interlocking means on the relay cooperating with the warp switch to prevent the initiation of a burner operating period by the warp switch contacts until the difference beween the warp switch temperature and the ambient temperature is below a predetermined amount, a time delay manually reset lock-out switch for rendering the system inoperative including an actuator energized by the condition responsive means for opening the lock-out switch, and combustion responsive means for preventing the opening of the lock-out switch during the existence of combustion.

20. An automatic oil burner system comprising a burner having a burner motor, an operating circuit for said burner motor and a relay switch controlling said circuit to start and stop said burner, a control circuit for said relay switch including a room thermostat, electric ignition means energized by closure of said relay switch, an ignition cut-off switch adapted to be opened to de-energize said ignition means, a thermal timer for controlling the opening of said cut-off switch comprising a pivoted carrier having a compensating bimetal element and an active bimetal element similarly mounted and positioned thereon to assume related positions in response to variations in ambient temperature, an abutment against which said compensating element may bear, timer positioning means operable upon said pivoted carrier with a yielding force to maintain said compensating element against said abutment, a heater for said active element, said active element acting normally when cold to maintain said ignition cut-off switch closed and operable when moved to its hot position by heating to cause opening of said ignition cut-off switch, an energizing circuit for said heater, a switch operable under the control of said timer to de-energize said heater when said ignition cut-off switch is opened, latch means operable to latch said active bimetal element of said timer in its hot position, said timer positioning means acting with a yielding force on said timer urging said latched active element toward its cold position, and said pivoted carrier of said timer permitting movement of said compensating element away from said abutment so as to avoid stress in said active element as said active element cools in its latched position, a safety switch constantly urged toward an open burner disabling position, combustion responsive means, means for maintaining said safety switch closed during normal burner starting and running, said last mentioned means being controlled by cooperative action of said control circuit and said combustion responsive means, and means operable by said relay when released to operate said latch means to release said active bimetal element of the timer for return to its cold position.

21. A control system for fluid fuel burners comprising in combination, an electrical fuel feeding device, an ignition device for the fuel, a circuit for said electrical fuel feeding device, a relay which when energized closes said circuit to said fuel feeding device, first switch means responsive to the demand for heat controlling said relay, a circuit for said ignition device also closed upon energization of said relay, and including a further switch means so arranged that the flow of current through said ignition device is independent of said first switch means except as said first switch means controls the operation of said relay, means for moving said second switch means to open position following the successful establishment of combustion, and means preventing the original energization of said relay by said first switch means unless said second switch means is in condition to pass current.

22. A control system for fluid fuel burners comprising in combination, a source of power, a transformer having primary and secondary windings, switch means, means connecting said primary winding across said source of power including said switch means, an electrical fuel feeding device, an ignition device for the fuel, a relay, a condition responsive device in circuit with said secondary winding for operatively energizing said relay, said relay upon energization establishing a circuit for said primary winding independent of said switch means, a circuit for said fuel feeding device and a circuit for said ignition device, the circuit for said ignition device including said switch means, and means for moving said switch means to open position following successful combustion.

23. A control system for fluid fuel burners comprising in combination, a source of power, a transformer having primary and secondary windings, switch means, means connecting said primary winding across said source of power including said switch means, an electrical fuel feeding device, an ignition device for the fuel, a relay, a condition responsive device in circuit with said secondary winding for operatively energizing said relay, said relay upon energization establishing a circuit for said primary winding independent of said switch means, a circuit for said fuel feeding device and a circuit for said ignition device the circuit for said ignition device including said switch means, means for automatcally moving said switch means to open position to terminate ignition after said fuel feeding device has been energized and for automatically reclosing said switch means as an incident to the termination of combustion.

24. A control system for fluid fuel burners comprising in combination, a source of power, a transformer having primary and secondary windings, switch means, means connecting said primary winding across said source of power including said switch means, an electrical fuel feeding device, an ignition device for the fuel, a relay, a condition responsive switch in circuit with said secondary winding for operatively energizing said relay, said relay upon energization establishing a circuit for said primary winding independent of said first named switch means, a circuit for said fuel feeding device and a circuit for said ignition device, both circuits being normally closed upon energization of said relay, the circuit for said ignition device including said first named switch means so arranged that the flow of current through said ignition device is independent of said condition responsive switch except as said condition responsive switch controls the operation of said relay, means for automatically moving said first named switch means to open position to terminate ignition after said fuel feeding device has been energized and for automatically reclosing said switch means as an incident to the termination of combustion.

25. In a control system for an electrical device, the combination of, a relay having a coil, an armature, and switching mechanism actuated thereby, said switching mechanism being moved to closed position by said armature when the coil is energized and being moved to open position by said armature when the coil is deenergized, a source of line voltage alternating current power, electrical connections including said switching mechanism and electrical device in series for connecting said electrical device to said source of power, a choke having a primary and secondary, electrical connections continuously connecting said primary and said relay coil across said source of power, switching mechanism for controlling the flow of current through said secondary for selectively causing energization or substantial deenergization of said relay coil, and means including a permanent magnet for biasing said armature away from the relay coil, said magnet increasing the current flow through the relay coil necessary to cause movement of said armature to its energized position and also tending to stabilize the armature in its deenergized position.

26. In an intermittent ignition type burner control system for controlling a burner having fuel feeding means and igniter means, the combination of, means for starting and stopping the fuel feeding means, thermal responsive switching means arranged to control said igniter means and movable after starting of the fuel feeding means from a first position rendering the igniter means operative to a second position rendering the igniter means inoperative, magnetic biasing means for biasing said thermal responsive switching means toward one of its positions, and means controlled with said fuel feeding means for controlling said magnetic biasing means.

27. In an intermittent ignition type burner control system for controlling a burner having fuel feeding means and igniter means, the combination of, means for starting and stopping the fuel feeding means, thermal responsive switching means arranged to control said igniter means and movable after starting of the fuel feeding means from a first position rendering the igniter means operative to a second position rendering the igniter means inoperative, means for biasing said thermal responsive switching mechanism toward its first position for delaying movement thereof toward its second position, and means actuated upon stopping of the fuel feeding means for reducing the effect of said biasing means.

28. In a control system for a burner, the combination of, means including a device responsive to the demand for heat from the burner for starting and stopping the same, means including thermal responsive switching means arranged to cooperate with said device in controlling the burner, said switching means having a first position which conditions the burner for starting and a second position which prevents starting of said burner, means for causing said switching means to move from its first position to its second position a period of time after starting of the burner and to return to its first position upon stopping of the burner, biasing means for biasing said switching means toward its first position, and means controlled with the burner for reducing the effect of said biasing means upon stopping of the burner.

29. In a control system for a burner, the combination of, means including a device responsive to the demand for heat from the burner for starting and stopping the same, means including thermal responsive switching means arranged to cooperate with said device in controlling the burner, said switching means having a first position which conditions the burner for starting and a second position which prevents starting of said burner, means for causing said switching means to move from its first position to its second position a period of time after starting of the burner and to return to its first position upon stopping of the burner, magnetic biasing means for biasing said thermal responsive switching means toward one of its positions, and means controlled with the burner for varying the effect of said magnetic biasing means.

30. In an intermittent ignition type burner control system for controlling a burner having fuel feeding means and igniter means, the combination of, means including a device responsive to the demand for heat from the burner for starting and stopping the fuel feeding means, means including thermal responsive switching means arranged to control the igniter means and the fuel feeding means and movable from a first position in which the fuel feeding means is conditioned to start and the igniter means rendered operative to a second position in which starting of the fuel feeding means is prevented and the igniter means is rendered inoperative, means for causing said thermal responsive switching means to move from its first position to its second position a period of time after starting of the fuel feeding means and for returning it to its first position upon stopping thereof, biasing means for biasing said thermal responsive switching means toward its first position, and means actuated upon stopping of the fuel feeding means for reducing the effect of said biasing means.

31. A control system for a burner having fuel feeding means and an igniter, the combination of, a relay adapted to place the fuel feeding means into and out of operation, igniter control means for controlling the igniter and effective to render the same operative when the fuel feeding means is placed into operation and to render the igniter inoperative a period of time thereafter, said igniter control means comprising a pair of bimetal elements arranged to compensate each other for changes in ambient temperature, a hinged support for both of said bimetal elements, each bimetal element having one end fixed to the hinged support and the other end free to move with respect to the hinged support, adjustable stop means associated with the free end of one of said bimetal elements, biasing means for biasing said free end against said stop means, igniter controlling switching mechanism actuated by the free end of the other bimetal element, a heater for one of said elements, means for controlling said heater and operative to cause said last mentioned element to change in temperature in a first direction when the fuel feeding means is placed into operation to cause actuation of said igniter controlling switching mechanism for rendering the igniter inoperative, means controlling said heater for causing its associated bimetal element to change in temperature in the opposite direction when the igniter is rendered inoperative, latch means for preventing return movement of said last mentioned element, and means actuated with said relay for releasing said latch means when the fuel feeding means is placed out of operation.

32. A burner control system for a burner having fuel feeding means and an igniter, the combination of, means for placing the fuel feeding means into and out of operation, igniter control means for controlling the igniter and effective to render the same operative when the fuel feeding means is placed into operation and to render the igniter inoperative a period of time thereafter, said igniter control means comprising a pair of bimetal elements arranged to compensate each other for changes in ambient temperature, a hinged support for both of said bimetal elements, each bimetal element having one end fixed to the hinged support and the other end free to move with respect to the hinged support, adjustable stop means associated with the free end of one of said bimetal elements, biasing means for biasing said free end against said stop means, igniter controlling switching mechanism actuated by the free end of the other bimetal element, a heater for one of said elements, and means for controlling said heater and operative to cause said last mentioned element to change in temperature when the fuel feeding means is placed into operation to cause actuation of said igniter controlling switching mechanism for rendering the igniter inoperative.

33. In a control system for a burner, the combination of, a base member, a supporting member, means including hinge means for pivotally attaching said supporting member to said base member, a pair of bimetal elements mounted side by side on said supporting member, each bimetal element having one end attached to said supporting member and the other end free to move with respect to the supporting member, adjustable stop means associated with the free end of one of said bimetal elements and with said base member, biasing means for biasing said free end against said stop means, and switching mechanism supported on said base member and controlled by the free end of the other bimetal element, said switching mechanism controlling said burner.

34. In a control system for a burner, the combination of, means including a device responsive to the demand for heat from the burner for starting and stopping the same, means including switching means arranged to cooperate with said device in controlling the burner, said switching means having a first position which conditions the burner for starting and a second position which prevents starting of said burner, means for causing said switching means to move from its first position to its second position upon starting of the burner and to return to its first position upon stopping of the burner, biasing means for biasing said switching means toward its first position, and means controlled with the burner for varying the effect of said biasing means.

35. In a control system for a burner, the combination of, a two position relay, means including a device responsive to the demand for heat from the burner for controlling the relay to start and stop the burner, means including switching means arranged to cooperate with said device in controlling the relay, said switching means having a first position which conditions the relay for movement to one of its positions and a second position which prevents movement of the relay to said one position, a first holding means tending to hold the switching means in its first position, a second holding means tending to hold the switching means in its second position, and means controlled by the relay for controlling both of said holding means.

36. In a control system for an electrical device, the combination of, a relay having a coil, an armature, and switching mechanism actuated thereby, said switching mechanism being moved to closed position by said armature when the coil is energized and being moved to open position by said armature when the coil is deenergized, a source of electric power, electrical connections including said switching mechanism and electrical device in series for connecting said electrical device to said source of power, electrical connections including a control switch for selectively energizing the relay coil from said source of power or deenergizing said relay coil, and means including a permanent magnet for biasing the armature away from said relay coil, said magnet increasing the current flow through the relay coil necessary to cause movement of the armature to its position wherein the switching mechanism connects the electrical device to the source of power.

LEWIS L. CUNNINGHAM.